Aug. 26, 1958 W. A. FICKETT ET AL 2,849,605

SINGLE SIDEBAND COMMUNICATION SYSTEM

Filed May 6, 1957 2 Sheets-Sheet 1

WITNESSES:
Bernard R. Gieguay
Leon M. Garman

INVENTORS
Walter A. Fickett and
David M. Chauvin
BY T. H. Murray
ATTORNEY

Aug. 26, 1958 W. A. FICKETT ET AL 2,849,605

SINGLE SIDEBAND COMMUNICATION SYSTEM

Filed May 6, 1957 2 Sheets-Sheet 2

United States Patent Office 2,849,605

Patented Aug. 26, 1958

2,849,605

SINGLE SIDEBAND COMMUNICATION SYSTEM

Walter A. Fickett, Severn, and David M. Chauvin, Glen Burnie, Md., assignors to Westinghouse Electric Corporation, East Pittsburgh, Pa., a corporation of Pennsylvania Application May 6, 1957, Serial No. 657,357

6 Claims. (Cl. 250—20)

This invention relates to single sideband communication systems and more particularly to a single sideband communication system which is especially adapted for use with V. H. F. signals and tropospheric scatter techniques.

In a conventional single sideband system, heterodyne interference is prevented by filtering out one of the two intelligence-carrying sideband frequencies and by suppressing the carrier frequency so that only the remaining sideband, and sometimes a pilot carrier, is fed into the system transmitter. At the receiver it is then necessary to reinsert a carrier frequency or to recover and amplify the pilot carrier in order to recover the intelligence being carried by the one sideband.

One of the major problems of single sideband operation has been the accuracy required of carrier reinsertion at the receiver, since a frequency error of more than 10 to 20 cycles is detrimental to audio reproduction, and a frequency error of more than 2 to 4 cycles is detrimental to musical reproduction. Various forms of automatic frequency control systems and high stability oscillators have been used in an attempt to minimize the frequency error, but the problem of frequencies used for V. H. F. and tropospheric scatter has been extremely complicated by the carrier frequency shift due to the Doppler effect of moving objects in the sky.

It is an object of this invention to provide a new and improved single sideband communication system.

More specifically, an object of the invention is to provide a tropospheric scatter single sideband system which will operate without frequency error even through the Doppler effect of moving objects is present.

Another object of the invention is to provide a single sideband system which requires no oscillators of extremely high stability or receiver automatic frequency control circuits.

A still further object of the invention is to provide means for deriving a signal of a predetermined frequency from a source of signals of varying frequencies.

The above and other objects and features of the invention will become apparent from the following detailed description taken in connection with the accompanying drawings which form a part of the specification and in which.

Figure 1:
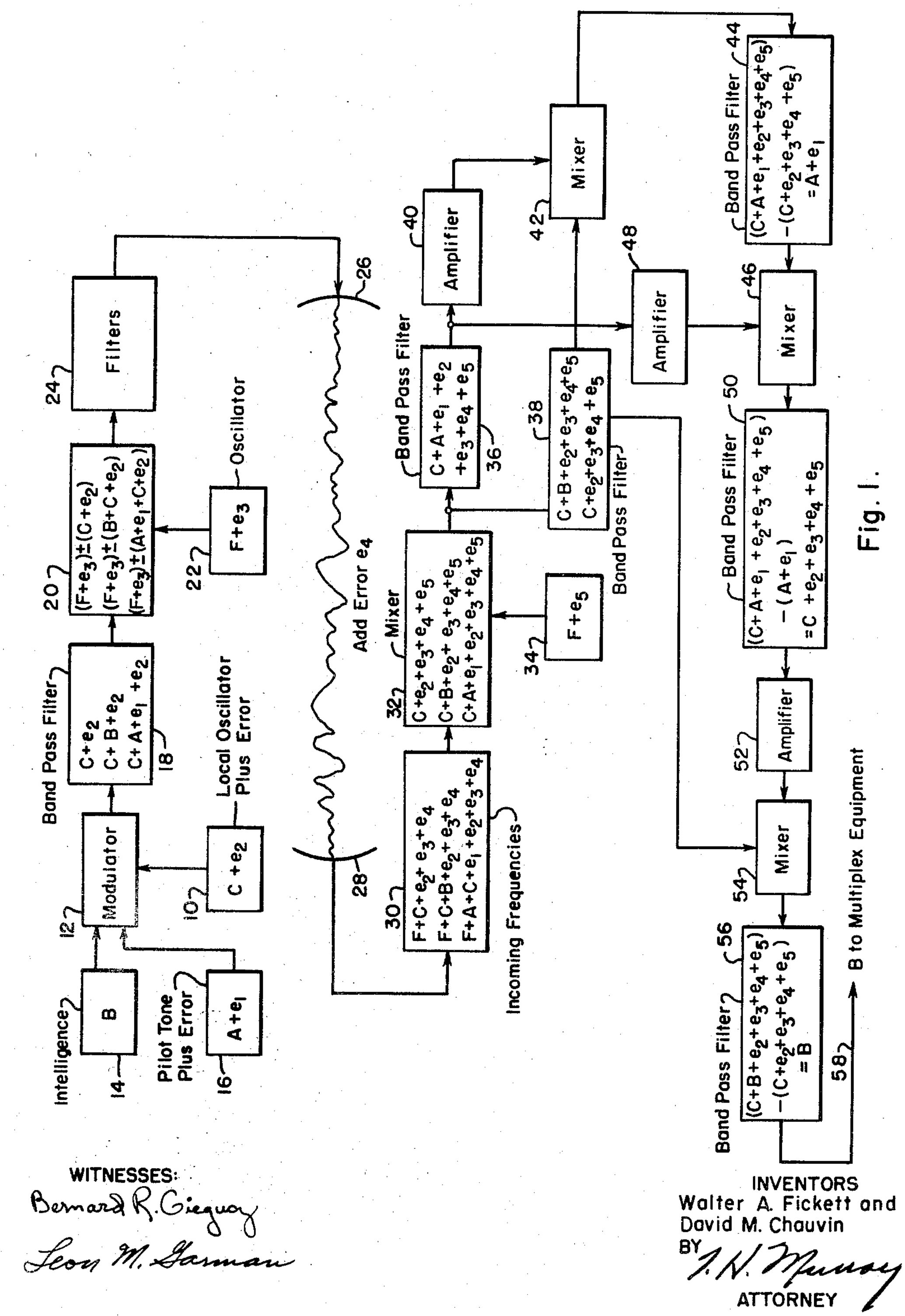
Figure 1 is a block diagram of the single sideband system of the invention.

Referring to Fig. 1, a local oscillator 10 having a frequency $C+e_2$, where $e_2$ is a frequency deviation or error, is fed to modulator 12 as a subcarrier signal. In the modulator 12 the subcarrier output of oscillator 10 is modulated with intelligence signals of frequency B from source 14 plus a pilot tone of frequency $A+e_1$ from tone generator 16, where $e_1$ is a frequency error. The output of modulator 12 is fed through a band-pass filter 18 which filters out one of the two intelligence-carrying sideband frequencies and passes frequencies equal to $(C+e_2)$, $(C+B+e_2)$ and $(C+A+e_1+e_2)$. The output of band-pass filter 18 is then used as a modulating signal in modulator 20 for carrier wave energy of frequency $(F+e_3)$ from oscillator 22, where $e_3$ is a frequency error. Thus, in the modulator 20 the following frequencies are produced: $[(F+e_3)\pm(C+e_2)]$, $$[(F+e_3)\pm(B+C+e_2)]$$

and $[(F+e_3)\pm(A+e_1+C+e_2)]$.

The output of modulator 20 is then fed through filters 24 which eliminate the difference frequency signals and pass only the sum frequency signals to a directional antenna 26 which radiates the energy to a similar directional antenna 28 in a single sideband receiver. During the transmission process an additional error $e_4$ is introduced into the signal due to the Doppler effect of moving objects in the sky.

The incoming frequencies passing through filter 30 in the receiver will, therefore, be: $(F+C+e_2+e_3+e_4)$, $(F+C+B+e_2+e_3+e_4)$, and $$(F+A+C+e_1+e_2+e_3+e_4)$$

The output of filter 30 is fed to mixer 32 where it is mixed with the output of a local oscillator 34 of frequency $F+e_5$. Ideally, the frequency output of local oscillator 34 in the receiver should show a constant frequency difference from the incoming carrier which may have been suppressed or converted to a pilot-carrier. However, this constant frequency difference is extremely difficult to maintain; and, therefore, the frequency error $e_5$ will usually be present in the receiver.

The output of mixer 32 is fed to two parallel signal channels, one of which includes a band-pass filter 36 and the other of which includes a band-pass filter 38. Band-pass filter 36 is designed to pass signals having a frequency $(C+A+e_1+e_2+e_3+e_4+e_5)$. Band-pass filter 38, on the other hand, is designed to pass both of the frequences $(C+B+e_2+e_3+e_4+e_5)$ and $$(C+e_2+e_3+e_4+e_5)$$

The output of band-pass filter 36 is passed through an amplifier 40 and then mixed with the output of band-pass filter 38 in mixer 42 to produce a difference frequency output. Thus, the output frequencies of mixer 42 will be:

$$(C+A+e_1+e_2+e_3+e_4+e_5)-(C+e_2+e_3+e_4+e_5)= A+e_1 \text{ and } (C+B+e_2+e_3+e_4)=A+e_1-B$$

$$(C+A+e_1+e_2+e_3+e_4+e_5)- (C+B+e_2+e_3+e_4+e_5)=A-B+e_1$$

The signal of frequency $(A-B+e_1)$ is blocked by band-pass filter 44, but the signal of frequency $A+e_1$ is passed through the band-pass filter to a mixer 46 where it is mixed with the output of band-pass filter 36 from amplifier 48 to produce an output difference frequency signal. Consequently, the output of mixer 46 will now be:

$$(C+A+e_1+e_2+e_3+e_4+e_5)-(A+e_1)= C+e_2+e_3+e_4+e_5$$

The output of mixer 46 is then passed through a band-pass filter 50, which is tuned to the frequency $$(C+e_2+e_3+e_4+e_5)$$

and amplifier 52 to a fourth mixer 54 where it is mixed with the output of band-pass filter 38 to produce a difference frequency signal. Consequently, the output of mixer 54 which is fed to band pass filter 56 is:

$$(C+B+e_2+e_3+e_4+e_5)-(C+e_2+e_3+e_4+e_5)=B$$

As will be understood, the component $$(C+e_2+e_3+e_4+e_5)$$

from filter 38 cancels with this same component from filter 50. Band-pass filter 56 is tuned to frequency B; and, thus, the intelligence passes through this filter to lead 58 where it is fed to multiplex equipment, not shown, where the signal is detected and the intelligence reproduced. It should be noted that the intelligence B has passed through only two receiver mixers, 32 and 54.

Figure 2:
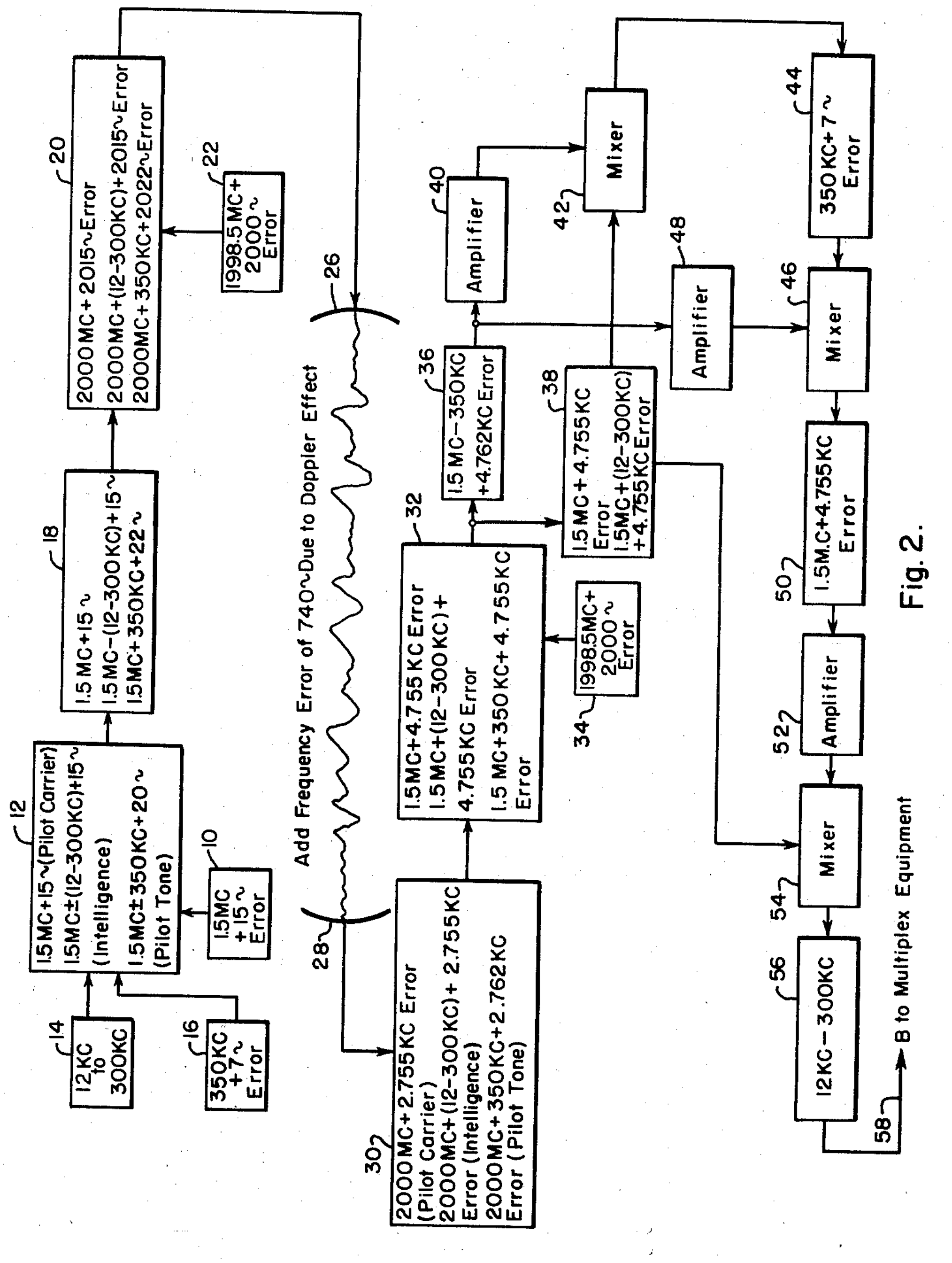
Fig. 2 is a block diagram similar to that of Fig. 1, but including specific frequencies to illustrate the operation of the invention.

Detailed operation of the invention may best be understood by reference to Fig. 2 where specific frequencies of the various signals are shown. The modulating frequencies shown in source 14 may be any desired frequencies, including audio, but for the system described are multiplex frequencies ranging from 12 kc. to 300 kc. The pilot tone from generator 16 is shown as 350 kc. This tone has only two requirements: one, it must be slightly higher in frequency than the highest modulating frequency from source 14; and two, it must be spaced above the highest modulating frequency by frequency separation which is greater than the maximum expected instability of the complete system including the Doppler effect. In the system described, the instability of the various oscillators shown is calculated to be one part in $10^6$ in both the transmitter and receiver together with a maximum Doppler effect of 740 cycles, giving a maximum frequency error, as will be shown, of about $\pm 4.75$ kc. The separation of 50 kc. between the intelligence and tone signals was chosen to allow about 40 kc. for filter cutoff slope, thus reducing the cost and difficulty of obtaining filters.

Investigation of the stability of a two-path fade over a 300 mile distance shows that no frequency in a bandwidth of 350 kc. will fade more than 7 to 8 db in relation to any other frequency in the same bandwidth. This insures against the selective loss of the pilot tone source 16 or the intelligence from source 14.

The output frequency of local oscillator 10 is 1.5 mc. plus a possible 15 cycles error. As shown, the band of frequencies from modulator 12 which pass through band-pass filter 18 will contain the pilot carrier (1.5 mc.), the intelligence (1.5 mc. plus 12 to 300 kc.) or 1.512 to 1.8 mc., and the pilot tone (1.5 mc. plus 350 kc.) or 1.85 mc.

Mixer 20 will translate this 350 kc. band of frequencies up to about 2000 mc. where, with its accumulated frequency error, it will be radiated from antenna 26. Note that the same error has been added to all frequencies within the band except that the pilot tone still has an additional original error of 7 cycles.

During the radiated transmission the frequencies may be shifted (by tropospheric scatter) up to about 740 cycles. Thus, when the signal arrives at filter 30 in the receiver, the pilot carrier and intelligence will have an accumulated frequency error of 2.755 kc., and the pilot tone will have an accumulated error of 2.762 kc. The local oscillator 34 introduces another frequency error component of 2 kc. so that after passing through mixer 32 two of the frequency components have an error of 4.755 kc., and one has an error of 4.762 kc. In mixer 42 the signal of (1.5 mc.+350 kc.+4.762 kc.) is mixed with the signal from band-pass filter 38 of (1.5 mc.+4.755 kc.) to produce a difference frequency signal of 350 kc. plus 7 cycles error which passes through band-pass filter 44. This signal is now mixed in mixer 46 with the signal from band-pass filter 36 of (1.5 mc.+350 kc.+4.762 kc.) to produce a difference frequency signal of (1.5 mc.+4.755 kc.)

which passes through band-pass filter 50 and amplifier 52 to mixer 54. In mixer 54 the signal from filter 50 is mixed with the output of band-pass filter 38 of (1.5 mc.+12 to 300 kc.+4.755 kc.)

to produce a difference frequency signal of (12 kc. to 300 kc.) which is the multiplex or intelligence frequencies.

As will be understood, the system has many distinct advantages over a system requiring high stability automatic frequency control and filters capable of separating the pilot carrier directly from the intelligence. The pilot carrier (1.5 mc.) with an error of $\pm 4.755$ kc. would be very difficult to separate from the intelligence which has a lower frequency of 1.512 mc.$\pm$4.755 kc. as it would require a filter which could separate 1.504755 mc. from 1.507245 mc., a frequency difference of only 2.91 kc. If the intelligence band contained audio components the separation by means of filters would be impossible as the frequency shifts due to error and Doppler effect would cause the frequency bands at times to overlap. The system of the present invention requires only a relatively simple filter to separate the pilot tone from the intelligence and pilot carrier, since the pilot tone frequency is selected with sufficient frequency separation from the intelligence to allow for the calculated frequency shifts.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a single sideband system for receiving a signal comprising carrier wave energy of frequency F modulated with a subcarrier signal of frequency C which is modulated with intelligence of frequency B and a pilot tone of frequency A, the combination of a local oscillator having an output of frequency F, first means for mixing the output of said local oscillator with the signal received by said system to produce a difference frequency signal, a pair of signal channels connected to the output of said mixing means, one of said channels including a first band-pass filter designed to pass signals in a frequency band centered around the sum of frequencies C plus A, the other of said channels including a second band-pass filter designed to pass signals having a frequency band centered around C plus B and C, second means for mixing the outputs of said first and second band-pass filters to produce a difference signal frequency, a third band-pass filter connected to the output of said second mixing means for passing signals in a frequency band centered around the frequency A, third means for mixing the outputs of said first and third band-pass filters to produce a difference frequency signal, a fourth band-pass filter connected to the output of said third mixing means for passing signals in a frequency band centered around the frequency C, fourth means for mixing the output of said fourth band-pass filter with the output of said second band-pass filter to produce a difference frequency signal, and a fifth band-pass filter connected to the output of said fourth mixing means for passing signals in a frequency band centered around the frequency B.

2. In a single sideband system for receiving a signal comprising carrier wave energy modulated with a subcarrier signal which is modulated with intelligence and a pilot tone, the combination of a local oscillator, first means for mixing the output of said local oscillator with the signal received by said system to produce a difference frequency signal, a pair of signal channels connected to the output of said mixing means, one of said channels including a first band-pass filter designed to pass signals having a frequency substantially equal to the sum of the frequencies of said subcarrier and pilot tone signals, the other of said channels including a second band-pass filter designed to pass signals having a pass band wide enough to accommodate signals having a frequency equal to the sum of the frequencies of said subcarrier and intelligence signals and the frequency of said subcarrier signal alone, second means for mixing the outputs of said first and second band-pass filters to produce a difference frequency signal, a third band-pass filter connected to the output of said second mixing means and having a pass band wide enough to accommodate signals having a frequency equal to the frequency of said pilot tone, third means for mixing the outputs of said first and third band-pass filters to produce a difference frequency signal, a fourth band-pass filter connected to the output of said third mixing means for passing signals having a frequency substantially equal to the frequency of said subcarrier signal, fourth means for mixing the output of said fourth band-pass filter with the output of said second band-pass filter to produce a difference frequency signal, and a fifth band-pass filter connected to the output of said fourth mixing means for passing signals having a frequency in the range of the frequency of said intelligence signal.

3. In a single sideband receiving system, the combination of a local oscillator, first means for mixing the output of said local oscillator with a signal received by said system to produce a difference frequency signal, a pair of signal channels connected to the output of said mixing means, one of said channels including a first band-pass filter and the other of said channels including a second band-pass filter, second means for mixing the outputs of said first and second band-pass filters to produce a difference frequency signal, a third band-pass filter connected to the output of said second mixing means, third means for mixing the outputs of said first and third band-pass filters to produce a difference frequency signal, a fourth band-pass filter connected to the output of said third mixing means, fourth means for mixing the output of said fourth band-pass filter with the output of said second band-pass filter to produce a difference frequency signal, and a fifth band-pass filter connected to the output of said fourth mixing means.

4. In a single sideband receiving system, the combination of a local oscillator, first means for mixing the output of said local oscillator with a signal received by said system, a pair of signal channels connected to the output of said mixing means, one of said channels including a first filter and the other of said channels including a second filter, second means for mixing the outputs of said first and second filters, a third filter connected to the output of said second mixing means, third means for mixing the outputs of said first and third filters, a fourth filter connected to the output of said third mixing means, fourth means for mixing the output of said fourth filter with the output of said second filter, and a fifth filter connected to the output of said fourth mixing means.

5. Means for selecting a signal of a particular frequency from a plurality of signals of varying frequencies comprising, in combination, a pair of signal channels connected to said source of signals of varying frequencies, a first band-pass filter in one of said channels, a second band-pass filter in the other of said channels, first means for mixing the outputs of said first and second filters to produce a difference frequency signal, a third band-pass filter connected to the output of said first mixing means, second means for mixing the output of said third band-pass filter with the output of said first band-pass filter, a fourth band-pass filter connected to the output of said second mixing means, third means for mixing the output of said fourth band-pass filter with the output of said second band-pass filter, and a fifth band-pass filter connected to the output of said third mixing means.

6. Apparatus for separating a signal of a particular frequency from a plurality of signals of varying frequencies comprising, in combination, a pair of signal channels connected to said source of signals of varying frequencies, one of said channels including a first filter and the second of said channels including a second filter, first means for mixing the outputs of said first and second filters, a third filter connected to the output of said first mixing means, second means for mixing the output of said third filter with the output of said first filter, a fourth filter connected to the output of said second mixing means, third means for mixing the output of said fourth filter with the output of said second filter, and a fifth filter connected to the output of said third mixing means.

No references cited.